United States Patent
Braun

[11] 3,958,841
[45] May 25, 1976

[54] NON-FRICTION PRESSURE SEAL
[76] Inventor: Anton Braun, 6421 Warren Ave., Minneapolis, Minn. 55435
[22] Filed: Feb. 21, 1975
[21] Appl. No.: 551,772

[52] U.S. Cl. .............................................. 308/3.5
[51] Int. Cl.² ...................................... F16C 17/00
[58] Field of Search ............. 308/3.5, 237 R, 238, 308/DIG. 4, 5 R; 92/168

[56] References Cited
UNITED STATES PATENTS

| | | | |
|---|---|---|---|
| 2,706,665 | 4/1955 | Brooks et al. | 308/3.5 |
| 3,330,605 | 7/1967 | Jasmand | 308/3.5 |

*Primary Examiner*—M. H. Wood, Jr.
*Assistant Examiner*—Gene A. Church
*Attorney, Agent, or Firm*—Alan M. Staubly

[57] ABSTRACT

A seal between compression chambers of a compressor which preferably embodies a relatively long sleeve having an inside diameter only slightly larger than the diameter of a piston rod that extends between and in to the compression chambers. The sleeve is floatingly supported in and sealed against the housing of the compressor so as to enable it to adjust itself to always remain substantially concentric with respect to the rod without assuming appreciable bearing forces. Preferably the inner surface of the sleeve has a good bearing material on or imbedded in at least two end portions of the sleeve.

The seal may also take the form of a long bore in a wall between areas of different gas pressures for preventing substantial leaking of gas lengthwise thereof between the wall of the bore and a movable rod, of slightly smaller diameter, which extends therethrough.

Either one of the above mentioned seals may also be combined with a short length bearing, having an inside diameter which, when coated with a film of lubricant, is of substantially the same diameter as a movable rod extending through the bearing but smaller than the diameter of the seal bore. The bearing may be located anywhere between either end of the seal bore and the middle thereof.

14 Claims, 7 Drawing Figures

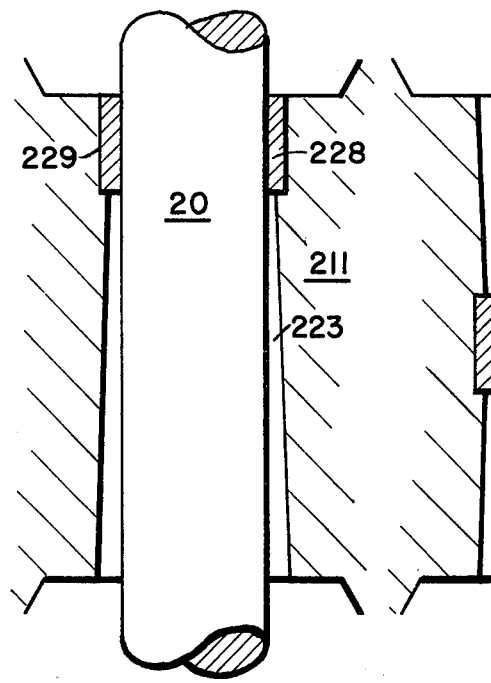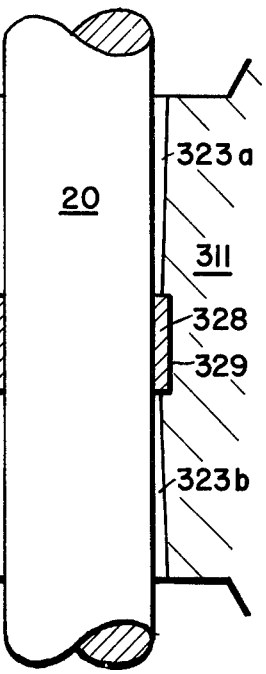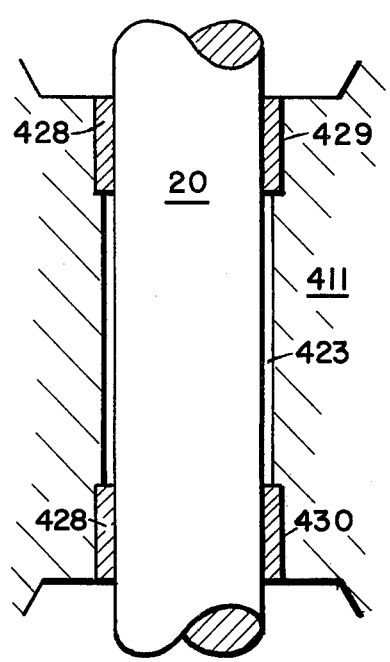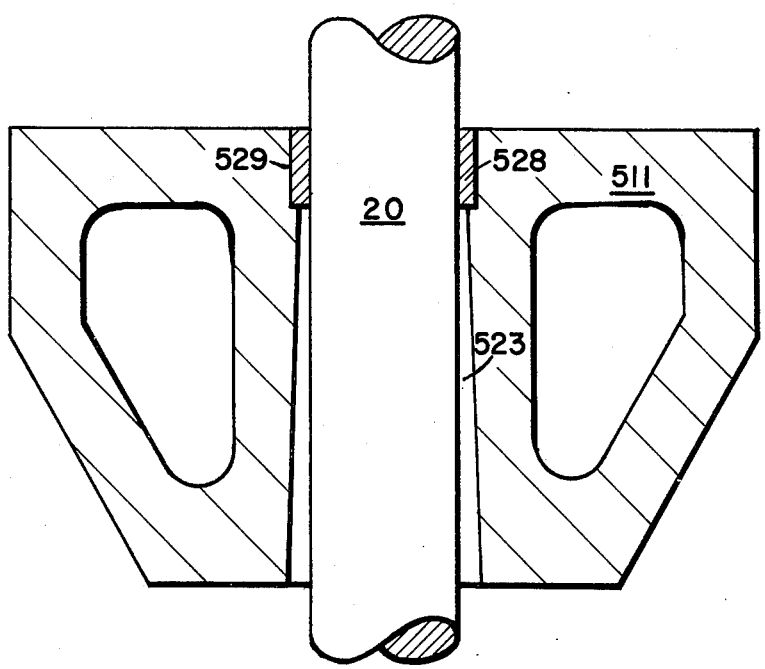

NON-FRICTION PRESSURE SEAL

Seals between pressure chambers are generally well known in various arts. However, in the compressor field, seals between the pressure chambers of a multiple stage compressor or between areas of different pressures have generally taken the form that tightly engage the piston rods of compressor pistons and, therefore, are subject to wear and frequent replacement. Furthermore the seals are usually located deep within the compressor so that costly and time consuming dismantling of the compressor is required to replace them.

The long standing need for a long-lasting seal is satisfied by the present invention which lies in a seal that does not tightly engage the piston rod of a compressor piston or pistons but relies on the viscous friction of the working fluid in a long narrow annular gap between the piston rod and a long bore surrounding the rod for the sealing function. Preferably, the long bore is in a long sleeve which is anchored by a universal coupling in a chamber between the two spaced pressure areas with sealing means between the outer surface of the sleeve and the wall of the enclosing chamber.

FIG. 1 of the drawing is a fragmentary drawing of a compressor showing the invention in longitudinal cross-section;

FIG. 4 is a fragmentary sectional view of another modification of the invention;

FIG. 5 is a view similar to that of FIG. 4 of a further modification of the invention;

FIG. 6 is a still further modification; and

FIG. 7 is another modification in a section of a cored casting.

Figure 1:
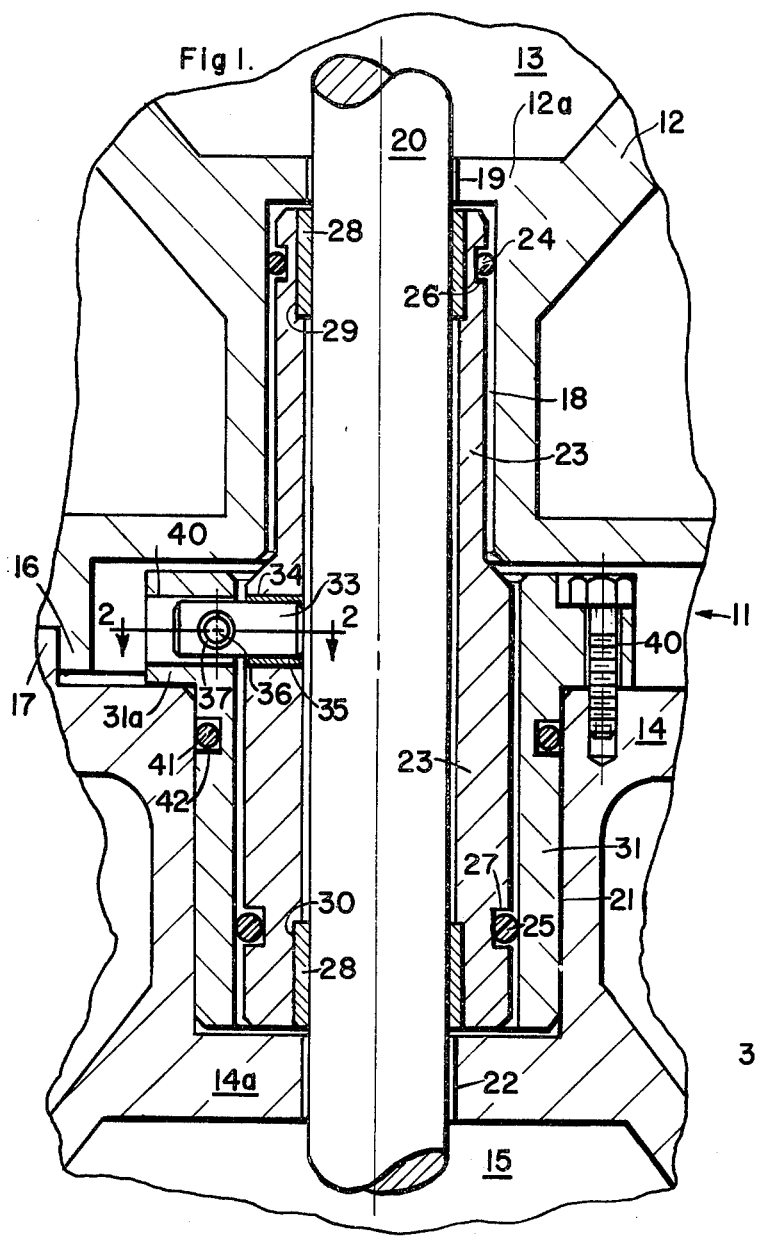

Referring to FIG. 1, the reference numeral 11 generally designates the housing of a compressor having a section 12 enclosing a pressure chamber 13 and a second section 14 enclosing another pressure chamber 15. The upper section has an axially extending annular flange 16 nesting in a counter bore 17 in section 14. The two sections are preferably secured together by means of bolts (not shown). The upper section 12 has an axial stepped bore therein providing a chamber 18 and an opening 19 having a diameter substantially greater than that of a piston rod 20 extending therethrough. The lower section 14 has a coaxial stepped bore therein providing a chamber 21 of larger diameter than 18 and an opening 22 of a diameter substantially the same as 19 and through which rod 20 extends.

Positioned in chambers 18 and 21 is a sleeve 23 which has an inside diameter only slightly greater than the diameter of rod 20 (0.004 of an inch in the illustrated embodiment). An upper portion of the sleeve has an outside diameter approximately 0.012 of an inch less than bore or chamber 18 while a lower portion thereof has an outside diameter approximately 0.012 of an inch less than the inside diameter of a mounting sleeve 31. Rubber or other suitable O-ring seals 24 and 25 are located in annular grooves 26 and 27, repsectively, in the upper and lower outer surfaces of sleeve 23. Preferably, Teflon impregnated porous steel or other suitable material bushings 28 are suitably secured in annular inner recesses 29 and 30 at each end of sleeve 23. The inner diameter of bushings 28 is only slightly greater than the diameter of rod 20 but smaller than the inside diameter of sleeve 23.

Figure 2:
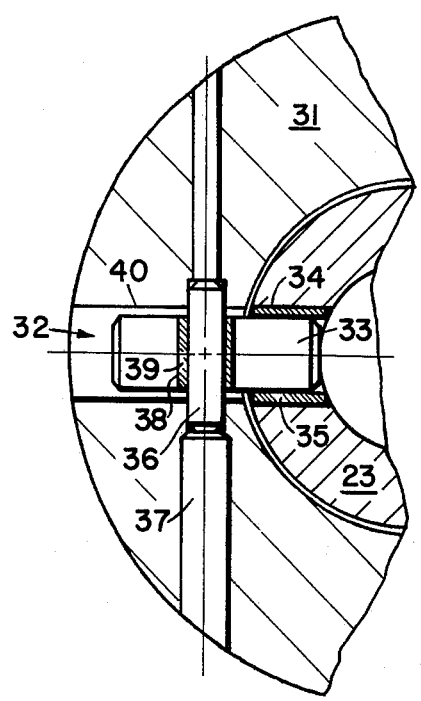
FIG. 2 is a fragmentary sectional view taken along line 2—2 of FIG. 1.

Preferably, sleeve 23 is swivelly held in place in the compressor's housing by a universal coupling generally designated by the numeral 32, between it and mounting sleeve 31 (see FIG. 2). The coupling has pivot pin 33 that extends into a bore 34 in sleeve 23, with a bearing collar 35 therebetween. A second smaller diameter pin 36 is located in a stepped transverse bore 37 through the upper portion of mounting sleeve 31 and extends through an aligned bore 38 in an outwardly extending portion of pin 33, with a bearing bushing 39 therebetween. A bore 40 in a flange 31a, into which the pin 33 extends and which intersects bore 37, is of larger diameter than pin 33 so as to permit pin 33 and sleeve 23 to pivot slightly on pin 36. Obviously, sleeve 23 may also pivot slightly on pin 33 in a plane perpendicular to the plane of pin 33. This assures concentric adjustment of sealing sleeve 23 around piston rod 20 if it should shift slightly.

Mounting sleeve 31 has an annular flange 31a that rests on lower section 14 and is secured thereto by means of bolts 40. Thus secured, the upper and lower ends of sleeve 23 are spaced from flanges 12a and 14a, respectively, to allow for expansion of sleeve 23. An O-ring 41, in annular groove 42 in sleeve 31, seals the sleeve in section 14. The space between sleeve 23 and sleeve 31 is approximately the same as that between sleeve 23 and bore 18. It is obvious that the flexability of the O-rings will permit slight tipping of the sleeve 23 without permitting gas leakage past the O-rings. The space between piston rod 20 and collars 28 is approximately 0.0005 inch.

Figure 3:
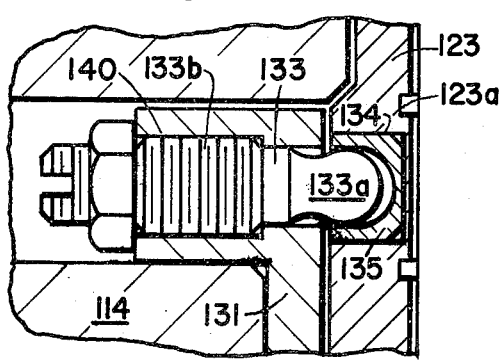
FIG. 3 is a view similar to that of FIG. 2 but of a modified form of the invention.

The modification of FIG. 3 structurewise and functionwise, is substantially the same as that of FIG. 1. The main differences being that a pin 133 with a ball-shaped head 133a and an enlarged threaded end 133b is used in place of the double pin 33 and 36 and the inner surface of sleeve 123 has one or more annular grooves 123a therein. The threads in a threaded portion of bore 140 hold the pin's head 133a in a cup-shaped bearing 135. Bearing 135 fits in and closes bore 134 in sleeve 123. The grooves create gas turbulence and thereby aids in reducing leakage.

In operation, as piston rod 20 is driven back and forth in a compressor having, for example, a first stage pressure chamber 15 and a second stage pressure chamber 13 and a compression piston (not shown) in each chamber, some gas will escape from one chamber to the other. In a typical case, where the gas is air and the chamber pressure differential is 75 psi, this loss amounts to about 0.0025 CSFM for a 400 SCFM compressor. This is an acceptable loss when it is appreciated that due to the fact that there is no friction between the piston rods and the sleeve, there is no wear to require replacement of the seal and costly shut down.

The floating arrangement of sleeve 23 in the compressor's housing allows for adjustment thereof in assembly or during operation with respect to the piston rod. The collar bearings 28 are desirable to act as a bearing for the minimal forces required for self adjusting should a bearing or bearings elsewhere in the compressor wear and cause slight transverse shifting of the piston rod. However bearing 28 could be dispensed with and still have sleeve 23 provide a good seal. Also, the bearings could be substituted for by impregnating or coating the inner surface of sleeve 23 with a good bearing material and accomplish substantially the same results.

Instead of a universal coupling for holding sleeve 23 in place, resilient means could be placed between the ends of sleeve 23 and flanges 12a and 14a. Obviously, other changes may be made without departing from the spirit of the invention.

In FIG. 4, a tapered bore 223 through a wall 211 increases in diameter from the top to the bottom thereof and has an annular recess 229 at the top end. A relatively short piston rod bearing 228 is suitably secured in the recess. The taper of the bore allows for some tipping of rod 20.

The modification of FIG. 5 has a bore 322a–b through wall 311 which decreases in diameter form the top to the middle thereof and then increases in diameter to the bottom of the bore. There is an annular groove 329 midway of the bore which holds a bearing 328. This arrangement requires less clearance between the rod and each end of the bores.

The FIG. 6 modification has a uniform diameter bore 423 through wall 411 with an annular recess 429 and 430 at each end thereof, respectively, and with a rod bearing 428 in each.

The modification of FIG. 7 is quite similar to that of FIG. 4 except that the upper end of the tapered bore 523 has the same diameter of the inside diameter of bearing 528 and the bore is through a single cored casting 511.

In operation, the modifications of FIGS. 4, 5 and 7 are to be used in conjunction with another bearing for the piston rod located either above or below the bearing and bore. The modification of FIG. 6 requires no additional piston rod bearing as the two spaced bearings 428 are all that is needed to guide rod 20.

If other bearings are provided elsewhere in the compressor for guiding rod 20, the bearing or bearings of each of the modifications could be eliminated and still have the bores serve as a seal between the spaces above and below the bores, just as the sleeve of FIG. 1 serves as a seal. If there is a bearing above and below the bore, the uniform diameter bore in sleeve 23 of FIG. 1 is preferred.

I claim:

1. In a compressor having at least two areas of different pressures a reciprocable piston rod extending between and into each area, sealing means comprising a wall with a long bore therethrough with respect to the bore's diameter with said bore having an inside diameter only slightly larger than the diameter of the rod for surrounding the rod between said areas with a gas filled space between the rod and bore in the compressor so as to prevent substantial gas flow between the areas through the space between said rod and bore.

2. Sealing means as defined in claim 1 wherein said sealing means is in the form of a sleeve mountable in the compressor so as to provide a floating action thereof in the compressor and to maintain a spaced relationship with respect to the piston rod.

3. Sealing means as defined in claim 2 wherein the inner surface of said sleeve at least at each end thereof is of a good bearing material.

4. Sealing means as defined in claim 3 wherein said bearing material is in the form of a collar at least partially recessed into said sleeve.

5. Sealing means as defined in claim 2 wherein said sleeve includes at least one O-ring of resilient material located in at least one annular groove in the outer surface of said sleeve for closing the space between the sleeve and a surrounding portion of the compressor.

6. Sealing means as defined in claim 2 wherein said sleeve has coupling means intermediate its ends for swivelly connecting it to a wall of the compressor on two axes.

7. Sealing means as defined in claim 6 wherein said coupling means includes a mounting sleeve located around said sealing means and means for securing said mounting sleeve in the compressor.

8. Sealing means as defined in claim 1 wherein said bore is more than twice as long as its inside diameter.

9. Sealing means as defined in claim 1 wherein the inner surface of said bore has one or more grooves therein extending around the periphery thereof.

10. Sealing means as defined in claim 1 wherein said bore tapers in diameter from one end thereof to the other end and an annular piston rod bearing is located in a recess in the bore at the narrower end thereof.

11. Sealing means as defined in claim 1 wherein the bore increases in diameter from the center thereof to the ends thereof and there is a piston rod bearing fixed therein substantially at the center thereof.

12. Sealing means as defined in claim 1 wherein said bore has an annular piston rod bearing at each end thereof to serve as the sole guiding means for the rod.

13. A compressor as defined in claim 2 wherein said wall includes a sleeve floatingly mounted therein for transverse and tipping movement thereof but held against axial movement, and wherein the mounting means for said sleeve includes means for preventing gas from leaking between said chambers around said sleeve.

14. A compressor as defined in claim 13 wherein said sleeve is mounted in a second sleeve which is fixedly positioned in said wall between said areas.

* * * * *